March 7, 1961     W. D. PETERSON     2,974,015
PREPARATION OF BOROHYDRIDES AND THEIR INTERMEDIATES
Filed Aug. 20, 1957

INVENTOR.
Willard D. Peterson
BY Eckhoff & Slick
By Robert A. Eckhoff
a member of the firm 2,974,015

PREPARATION OF BOROHYDRIDES AND THEIR INTERMEDIATES

Willard D. Peterson, San Marino, Calif., assignor to American Potash & Chemical Corporation, a corporation of Delaware Filed Aug. 20, 1957, Ser. No. 679,799

2 Claims. (Cl. 23—204)

This invention relates to the manufacture of boron hydrides, particularly sodium borohydride, diborane, and derivatives thereof.

It has heretofore been proposed to manufacture boron compounds by causing the vapors of the boron halide mixed with hydrogen to contact a mass containing an electro-positive metal selected from the class consisting of the alkaline metals and the alkaline earth metals, particularly magnesium, zinc and aluminum, the reaction being carried out at a temperature within the range of approximately 200°–400° C. (See Patent 2,469,879.)

I have discovered that improved yields of sodium borohydride and diborane can be secured by dispersing metallic sodium on finely divided sodium chloride, particularly one which is prepared in a state of chemically fine division and good dispersion characteristics. The sodium chloride required initially is prepared by a separate operation and serves for the initial charge; a suitable sodium chloride is a product of the reaction as appears in reaction (1) and thereafter excess sodium chloride is produced so that once the process is in operation an adequate supply of sodium chloride is provided.

(1) $6Na + 3H_2 + 2BCl_3 \rightarrow B_2H_6 + 6NaCl$

The process involves a sequence of automatically controlled additions of sodium, hydrogen and boron trichloride as required stoichiometrically into a rapidly agitated fluidized support of solid sodium chloride at an elevated temperature, e.g., of the order of 200°–300° C.

It is in general an object of the present invention to provide an improved process for the manufacture of sodium borohydride and its volatile derivatives such as diborane and dimethoxyborine.

In practicing the invention, the charge of sodium chloride is maintained dispersed in the reaction zone and a small charge of molten sodium is dispersed upon the sodium chloride. Thereafter, measured small increments of hydrogen are added until the pressure within the system attains a predetermined value which remains constant for a predetermined time. Thereafter, boron trichloride is admitted in increments until the pressure attains a predetermined value which remains constant, following which the reaction gas mixture is flushed from the reaction zone with hydrogen. Thereafter, the cycle is repeated, starting again with the introduction of another small charge of molten sodium which becomes dispersed on the finely divided salt generated by the foregoing sequence of reactions.

Figure 1:
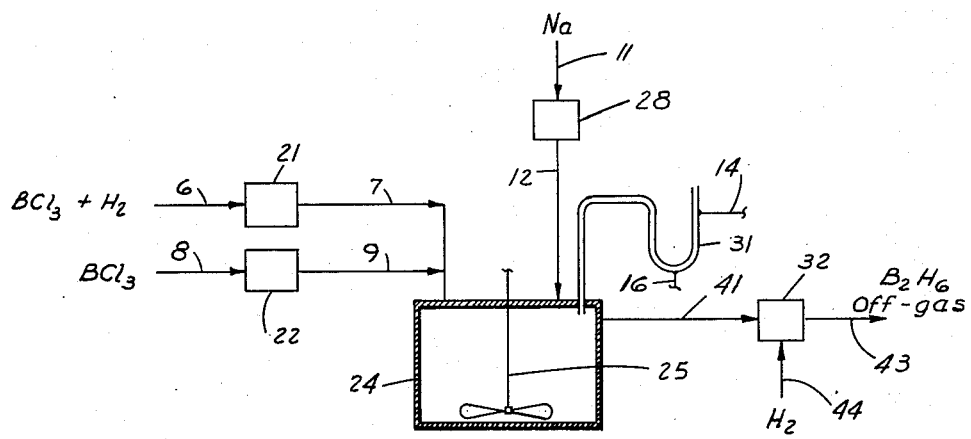
Figure 2:
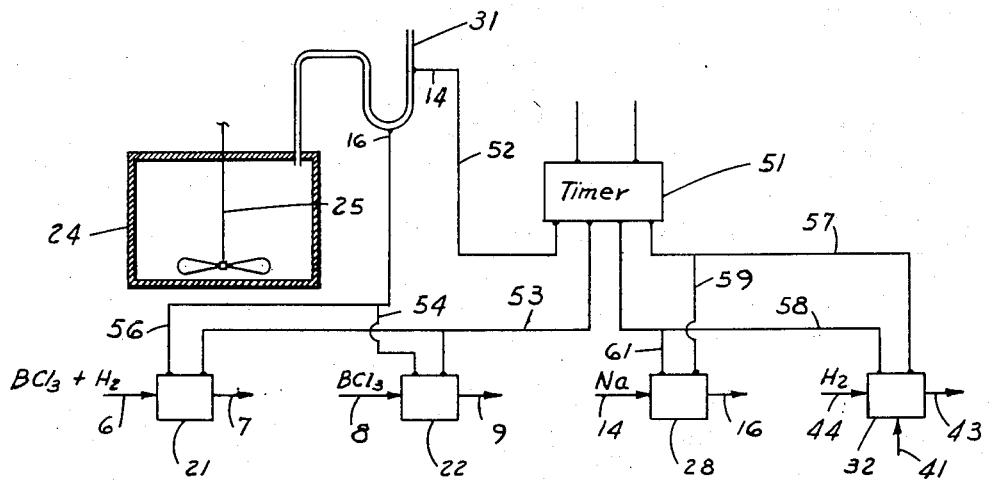

Referring to the drawing accompanying and forming a part hereof, Figure 1 is a schematic showing of an apparatus and flow sheet which may be employed, while Figure 2 is a schematic representation of apparatus and a suitable circuit which can be employed.

Referring to the drawing, we have shown a closed reaction vessel 24 equipped with a thermostatically controlled heater, not shown, and a stirring device 25. Boron trichloride and hydrogen, preferably pre-mixed in the stoichiometric ratio, are admitted from line 6 under the control of magnetic valve 21 through line 7 to the vessel 24. Boron trichloride is admitted from line 8 under the control of solenoid valve 22 through line 9 to the vessel 24, while molten sodium is admitted from a supply 11 under control of solenoid valve 28 through line 12 to the reaction vessel 24. A mercury manometer 31 having electrical contacts 14 and 16 is provided. Gases from the reaction vessel 24 are led off through line 41 under the control of solenoid valve 32 to exit line 43, while hydrogen for flushing the system is admitted from line 44 under control of the solenoid valve 32.

The timing device generally indicated at 51 establishes the sequence of operations as dictated by the pressure changes within the system. This device is capable of timing various operations as well as providing pulse timing control. The timer is connected by line 52 to contact 14 on the mercury manometer 31 and by line 53 to one side of each of the magnetic valves 21 and 22. The other side of each of magnetic valves 21 and 22 is connected by lines 54 and 56 to contact 16 on the manometer 31. Valves 28 and 32 are similarly connected by lines 57, 58, 59 and 61 to each of valves 32 and 28.

In operation, the reaction vessel being up to temperature and charged with finely divided sodium chloride which is maintained dispersed in an atmosphere of hydrogen by operation of stirrer 25, the timing device activates a pulse timer which opens the sodium admission valve 28 at intervals and permits increments of molten sodium to enter. The sodium addition lowers the pressure in the vessel 24, opening the circuit through the timer and the sodium valve 28. The sodium reacts with the hydrogen present. Simultaneously with closing of the sodium valve, the boron trichloride-hydrogen mixture valve 21 is opened. Increments of this mixed gas are admitted repeatedly until the pressure remains constant over a measured time interval as pre-set in the timer 51. During this interval the sodium is converted to sodium borohydride as follows:

$$4Na + 2H_2 + BCl_3 \rightarrow NaBH_4 + 3NaCl$$

As an alternate to the above, the introduction of hydrogen followed by the introduction of $BCl_3$ can be accomplished by incremental addition of each of these reagents under the control of separate valves. The process then proceeds step-wise as follows:

$$4Na + 2H_2 \rightarrow 4NaH$$
$$4NaH + BCl_3 \rightarrow NaBH_4 + 3NaCl$$

The sodium borohydride-sodium chloride mixture can be isolated if desired at this stage of the process for it is a finely divided product of low density, being light and fluffy and well suited for further use. In this instance the timer is set to by-pass activation of valve 32 which is used only if volatile borohydrides are to be generated and flushed from the reaction zone.

When the sodium borohydride is to be converted in situ to diborane the timer 51 is set to proceed with the necessary sequence of operations. To this end, the pressure having remained constant for a predetermined period, valve 21 is closed and simultaneously valve 22 opens to admit boron trichloride as required by the reaction:

$$3NaBH_4 + BCl_3 \rightarrow 2B_2H_6 + 3NaCl$$

The boron trichloride is admitted under the control of a pulse timer which effects alternate admissions of $BCl_3$ and opening of three-way valve 32 to release the diborane formed. Valve 32 is supplied with hydrogen from line 44 to sweep the released diborane on through line 43. The off gas is a mixture of $BCl_3$, $B_2H_6$, hydrogen and disproportionation products from which the $B_2H_6$ is recovered or used as such. The pulse timer operates for a pre-set time interval (5–45 seconds), as pre-set in the pulse timer, after which the process repeats. The reactor at this time is filled with hydrogen from the diborane purge and is ready to receive the next increment of sodium.

As another procedure, the sodium borohydride may be converted to the volatile methoxyborines from which diborane can be recovered. In this case the timer device responds to the pressure changes within the reactor to effect, in proper sequence and amounts, the introduction of reagents for production of sodium borohydride as described above. At the point in the cycle involving valve 22, methyl borate as well as boron trichloride is introduced into the system. The molecular ratio of ester to halide should be at least 8 to 1 in accordance with the stoichiometric requirements for generation of the volatile dimethoxyborine, as indicated by the equation:

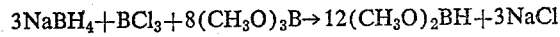

$$3NaBH_4 + BCl_3 + 8(CH_3O)_3B \rightarrow 12(CH_3O)_2BH + 3NaCl$$

Even higher ratios are advantageous because the methyl borate acts as a diluent for the boron trihalide and hence tends to moderate the reaction itself. Excess of the ester also causes a more rapid increase of pressure in the system than boron trichloride alone and this causes faster and more frequent valve action for releasing the volatile products from the reaction zone. This minimizes the residence time in the hot reaction zone and diminishes the quantity of polymeric boron products generated under these circumstances. In this process the methyl borate serves as the purging gas and therefore the alternate introduction of hydrogen through valve 32 is dispensed with. Instead, therefore, valve 32 opens to release the volatile products after the system remains at a pre-set pressure for a specified time interval as set in the timer device. This is repeated for a pre-set time interval set in the timer not dictated by pressure changes within the system.

The sodium chloride formed in the reaction remains as the fluidized solid support upon which further increments of sodium are dispersed for a repeat of the cycle. The collected off-gases contain diborane and dimethoxyborine. The latter may be disproportionated and the diborane recovered by simple distillation:

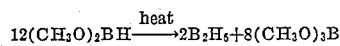

$$12(CH_3O)_2BH \xrightarrow{heat} 2B_2H_6 + 8(CH_3O)_3B$$

The methyl borate is recovered and recycled to the process. Hence, in effect, it serves as a diluent for the boron trichloride, a moderator for the reaction, a purging agent for the volatile products, and a solvent for the diborane.

As illustrative of the practice of the present invention, the following examples are set forth.

*Example 1.*—A very fluffy solid sodium methylate was prepared by introducing 59 grams of superheated methanol vapors (80°–100° C.) into a flask containing 40.3 grams of rapidly stirred molten sodium during a period of 80 minutes. This sodium methylate was, in turn, converted into an extremely fine dispersion of sodium chloride by introducing boron trichloride vapors at 150°–170° C. and with continued agitation. This salt was charged into a three-necked reactor equipped with stirrer, mercury manometer, timer device and magnetic valves for introduction of hydrogen, sodium and boron trichloride.

The system was purged with hydrogen and adjusted to operate under 45 millimeters mercury above atmospheric pressure. Agitation of the sodium chloride was effected and heating was applied and at 250° C. the automatic device was started for introducing increments of molten sodium. Reaction of the sodium with the hydrogen in the system caused a drop in pressure and closing of the sodium valve. Several rapid repeat additions of hydrogen then occurred before the pressure (45 mm.) in the flask remained constant for the uninterrupted pre-set period of the delay timer (set for 60 seconds). Then the boron trichloride valve was activated, and several rapid additions of this reagent occurred before the system again remained at 45 mm. pressure for the 10 second period pre-set for the boron trichloride valve. At this point the sodium valve was reactivated and the cycle repeated. During the reaction, the temperature was maintained between 220° C. and 280° C. When the reaction was stopped there had been added 32.4 grams of sodium, 12.1 liters of hydrogen (S.T.P.), and 25.9 grams of boron trichloride.

The reaction mixture, upon analysis showed that 6.6 grams of sodium borohydride had been formed and that approximately 8 grams of sodium hydride had not been converted to the borohydride, presumably because of a deficiency in the amount of boron chloride added.

*Example 2.*—The operation of Example 1 was repeated except that the pre-set timer for the BCl₃ valve was so adjusted that the pressure in the reactor was required to remain at a value of at least 45 mm. for 40 seconds, as compared to the 10 seconds of Example 1. This longer residence time permitted a greater degree of reaction of the BCl₃ with the preformed NaH before sodium addition was resumed.

*Example 3.*—Forty grams of molten sodium was converted into a very finely divided mass of sodium chloride in the manner described in Example 1 by converting it first into sodium methylate followed by reacting this with boron trichloride and removing the volatile methyl borate. The reaction flask, equipped with mercury manometer, stirrer, timer device, and magnetic valves with accompanying electrical circuits, was charged with this finely divided salt and purged with hydrogen. With the pressure adjusted to 80 millimeters of mercury above atmospheric, stirring and heating was begun. When the temperature reached 210° C. the timer device was turned on, starting the incremental addition of molten sodium. Immediate hydrogen absorption took place with an accompanying diminishing of pressure within the system. This caused closing of the sodium valve and activating of the valve for introduction of a mixture of hydrogen and boron trichloride. Addition of several increments of this mixture occurred before the pressure remained constant (at 80 mm.) for the duration of the delay interval (45 seconds) pre-set in the timer device. At this point the next stage of the cycle went into operation by activating the valve admitting the boron trichloride-methylborate mixture into the system, the pulse timer pre-setting being at 5 second intervals. The volatile products were condensed and infrared analysis showed the presence of high concentrations of diborane by virtue of the absorption peaks in the neighborhood of 3.2, 3.8–4.0, 6.2–6.4, 8.4–8.7, and 10.2 microns.

Heating of these solutions and partial rectification lead to recovery of substantially pure diborane.

Each of the above procedures was repeated with potassium and with lithium to show the utility of the alkali metals generally; the quantity of the alkali metal was adjusted on a molecular weight basis in each instance. Similarly, bromine and fluorine were used in place of chlorine with each of the alkali metals to show the utility of these in the process. In each case, generally similar results were obtained. In place of methyl borate one can use any of the borate esters of the lower alkyl alcohols such as ethyl, propyl, isopropyl, butyl or amyl alcohol.

I claim:

1. A process for the formation of sodium borohydride comprising: (1) agitating a mass of finely divided sodium chloride in a closed reaction zone while maintaining the temperature in said zone at between 200° and 400° C.; (2) adding hydrogen gas thereto whereby to raise the pressure within said zone to a predetermined level above atmospheric pressure; (3) incrementally passing molten sodium into said zone while agitating the said mass of finely divided sodium chloride whereby to disperse the said molten sodium throughout the said sodium chloride and continuing the addition thereto of said molten sodium until the pressure within the said zone drops by a perceptible amount and terminating the said sodium addition when this occurs; (4) incrementally passing additional hydrogen gas into said zone until the pressure within the said zone is restored to the said predetermined level above atmospheric pressure and continuing to introduce the said hydrogen gas increments until the pressure within the said zone remains constant for a predetermined time on the cessation of hydrogen addition; (5) incrementally passing boron trichloride gas into said zone until the pressure within the said zone remains constant at the said predetermined level above atmospheric pressure for a predetermined period of time on cessation of boron trichloride addition, and (6) thereafter repeating steps 3 to 5.

2. A process for the production of diborane and dimethoxyborine comprising: (1) agitating a mass of finely divided sodium chloride in a closed reaction zone maintained at a temperature of between about 200° and 400° C.; (2) passing hydrogen gas into said zone until a predetermined pressure above atmospheric pressure is reached within said zone; (3) incrementally passing molten sodium into said zone while agitating the said mass of finely divided sodium chloride whereby to disperse the said molten sodium throughout the said sodium chloride and continuing the addition thereto of said molten sodium increments until the pressure within the said zone drops by a perceptible amount and terminating the sodium addition when this occurs; (4) incrementally passing boron trichloride and additional hydrogen into said zone until the pressure within the said zone remains constant at the said predetermined level above atmospheric pressure on cessation of addition of said gas; (5) passing a mixture of boron trichloride and trimethyl borate ester into the said zone, the molecular ratio of ester to halide being at least about 8:1, the addition of said boron trichloride and said trimethyl borate in said ratio being of sufficient quantity to raise the pressure within said zone to a predetermined level above atmospheric and for a predetermined length of time on cessation of the addition of the said mixture; and (6) removing the volatile products therefrom.

References Cited in the file of this patent

UNITED STATES PATENTS

| | | |
|---|---|---|
| 1,796,265 | Freudenberg et al. | Mar. 10, 1931 |
| 2,372,671 | Hansley | Apr. 3, 1945 |
| 2,469,879 | Hurd | May 10, 1949 |
| 2,543,511 | Schlesinger et al. | Feb. 27, 1951 |
| 2,553,198 | Lesesne | May 15, 1951 |
| 2,596,690 | Hurd | May 13, 1952 |
| 2,744,810 | Jackson | May 8, 1956 |
| 2,770,526 | Lander | Nov. 13, 1956 |

OTHER REFERENCES

Kirk-Othmer: "Encyclopedia of Chemical Technology," 1948, vol. 2, pp. 593, 595.